United States Patent [19]
Davis et al.

[11] Patent Number: 5,251,325
[45] Date of Patent: Oct. 5, 1993

[54] BATTERY SAVING METHOD AND APPARATUS FOR PROVIDING SELECTIVE RECEIVER POWER SWITCHING

[75] Inventors: Walter L. Davis, Coral Springs; James G. Mittel, Boynton Beach, both of Fla.

[73] Assignee: Motorola, Inc., Schaumburg, Ill.

[21] Appl. No.: 532,844

[22] Filed: Jun. 4, 1990

[51] Int. Cl.⁵ .................. H04Q 3/02; H04B 1/16; H04B 7/00
[52] U.S. Cl. .................. 455/38.3; 455/343
[58] Field of Search .......... 455/343, 89, 38, 127, 455/38.3; 340/825.44, 311.1; 378/106, 107, 108

[56] References Cited

U.S. PATENT DOCUMENTS

| | | |
|---|---|---|
| 4,194,153 | 3/1980 | Masaki et al. |
| 4,479,261 | 10/1984 | Oda et al. ............ 455/343 |
| 4,518,961 | 5/1985 | Davis et al. ......... 340/825.44 |
| 4,523,332 | 6/1985 | Mori ................... 455/343 |
| 4,745,408 | 5/1988 | Nagata et al. ........ 455/343 |
| 4,816,820 | 3/1989 | Davis ................. 340/825.44 |
| 4,839,639 | 6/1989 | Sato et al. ........... 455/343 |
| 4,964,121 | 10/1990 | Moore ................ 340/825.44 |
| 5,027,428 | 6/1991 | Ishiguro et al. ...... 455/343 |
| 5,140,698 | 8/1992 | Toko .................. 455/343 |
| 5,150,361 | 9/1992 | Wieczorek et al. .... 455/343 |

OTHER PUBLICATIONS

Translation of Patent No. #2405109, Oct. 1974, Germany, Radio Receiving Equipment.

Primary Examiner—Reinhard J. Eisenzopf
Assistant Examiner—Lisa Charouel
Attorney, Agent, or Firm—Philip P. Macnak; William E. Koch; Thomas G. Berry

[57] ABSTRACT

A battery saving apparatus selectively supplies power to each receiver function of a battery powered communication receiver at predetermined time intervals prior to and continuing therefrom for enabling the reception of the coded message signals with each receiver function being powered only as long as is required for each receiver function to stabilize prior to the reception of the coded message signals.

11 Claims, 10 Drawing Sheets

BATTERY SAVING METHOD AND APPARATUS FOR PROVIDING SELECTIVE RECEIVER POWER SWITCHING

BACKGROUND OF THE INVENTION

1. Field of the Invention

This invention relates generally to the field of portable communication receivers, and in particular to portable communication receivers having selectively switched receiver battery saver functions.

2. Description of the Prior Art

In the current battery saver art, as it is practiced in paging receivers, all of the elements of the receiver portion of the paging receiver are switched ON and OFF simultaneously. This technique is shown in FIG. 1, which is an electrical block diagram of a typical prior art paging receiver. As shown in FIG. 1, the receiver portion of the paging receiver comprises a front end, or high conversion section 112 which includes a radio frequency (RF) amplifier 114, a first mixer 116, and a first oscillator 118. The supply of power to the front end 112 is controlled by a switched voltage regulator 120 which selectively supplies a regulated supply voltage from the battery to the front end 112 elements under control of a microcomputer decoder 122. The receiver portion of the paging receiver also comprises a back end, or low conversion section 124 which includes a second mixer 126, a second oscillator 128, an intermediate frequency (IF) amplifier 130, a demodulator 132, and an audio limiter 134. The supply of power to the second mixer 126, second oscillator 128, IF amplifier 130, demodulator 132, and audio limiter 134 is controlled by a switchable current source 136 which selectively supplies current to the back end 124 elements also under control of the microcomputer decoder 122. In the prior art paging receivers, both the front end 112 and back end 124 sections are simultaneously controlled by the microcomputer decoder 122 for the battery saving operation.

While the above technique has worked well in the past when the length of the ON period provided was considerably longer than the minimum turn-on time for each of the circuit elements in the receiver, the length of the receiver ON period in newer battery saving receivers are being of necessity shortened, due to a need to continue to reduce the average current drain of the receivers. The length of the receiver ON period for newer receiver designs are rapidly approaching the minimum turn-on times of many of the receiver functions, and in particular those of the oscillator circuits, voltage regulator circuits, and so on. There is a need to continue to provide even greater battery saving economy than currently available with the improvements obtained from ever shorter battery saver ON periods. Such continued battery savings improvements are not obtainable with the prior art techniques of switching power to the receiver portion of the paging receiver. An improved method for switching power to the receiver portion is required which will continue to enable reduction in the average current drain of paging receivers.

SUMMARY OF THE INVENTION

It is an object of the present invention to provide a battery saving apparatus having reduced receiver current drain.

It is a further object of the present invention to provide a battery saving apparatus which selectively controls the supply of power to the receiver functions to enable reduced current drain.

It is a further object of the present invention to provide a battery saving apparatus which is controlled by timing parameters stored in a code memory.

In a first embodiment of the present invention, a battery powered communication receiver for receiving coded message signals comprises a receiver portion for receiving and demodulating the coded message signals, and a battery saving means which is coupled to the receiver portion and is responsive to the coded message signals. The receiver portion includes a first receiver function requiring power to be supplied thereto for at least a first predetermined time interval prior to and continuing therefrom for enabling the reception of the coded message signals, and at least a second receiver function requiring power to be supplied thereto for at least a second predetermined time interval prior to and continuing therefrom for enabling the reception of the coded message signals. The battery saving means includes a first means for selectively supplying power to the first receiver function for the first predetermined time interval prior to and continuing therefrom for enabling the reception of the coded message signals, and at least a second means for selectively supplying power to at least the second receiver function for the second predetermined time interval prior to and continuing therefrom for enabling the reception of the coded message signals.

In a second embodiment of the present invention, a battery saver circuit for a battery powered communication receiver has a receiver portion including first and at least second receiver functions for receiving coded message signals. The battery saving circuit comprises a first means for selectively supplying power to at least the first receiver function, the first receiver function requiring power to be supplied for at least a first predetermined time interval prior to and continuing therefrom for enabling the reception of the coded message signals; and at least a second means for selectively supplying power to the second receiver function, the second receiver function requiring power to be supplied for at least a second predetermined time interval prior to and continuing therefrom for enabling the reception of the coded message signals.

In a third embodiment of the present invention a battery saving apparatus for a battery powered communication receiver which has a receiver portion including first and at least second receiver functions for receiving coded message signals comprises code memory means for storing predetermined timing information, timing means which is responsive to the predetermined timing information for periodically generating at least first and second battery saving timing control signals, a first means which is responsive to the first battery saving timing control signal for selectively supplying power to the first receiver function for a first predetermined time interval prior to and continuing therefrom for enabling the reception of the coded message signals, and at least a second means which is responsive to the second battery saving timing control signal for selectively supplying power to the second receiver function for a second predetermined time interval prior to and continuing therefrom for enabling the reception of the coded message signals.

In a first aspect of the present invention, a battery saver method for enabling the reception of coded message signals by a battery powered communication receiver which has a receiver portion which includes a first receiver function which requires power to be supplied thereto for at least a first predetermined time interval prior to and continuing therefrom for enabling the reception of the coded message signals, and at least second receiver function requiring power to be supplied thereto for at least a second predetermined time interval prior to and continuing therefrom for enabling the reception of the coded message signals. The method comprises the steps of:

selectively supplying power to the first receiver function for the first predetermined time interval prior to and continuing therefrom for enabling the reception of the coded message signals; and selectively supplying power to the at least second receiver function for the second predetermined time interval prior to and continuing therefrom for enabling the reception of the coded message signals.

BRIEF DESCRIPTION OF THE DRAWINGS

The features of the invention which are believed to be novel are set forth with particularity in the appended claims. The invention itself, together with its further objects and advantages thereof, may be best understood by reference to the following description when taken in conjunction with the accompanying drawings, in the several figures of which like reference numerals identify identical elements, in which, and wherein:

DESCRIPTION OF THE PREFERRED EMBODIMENTS

Figure 1:
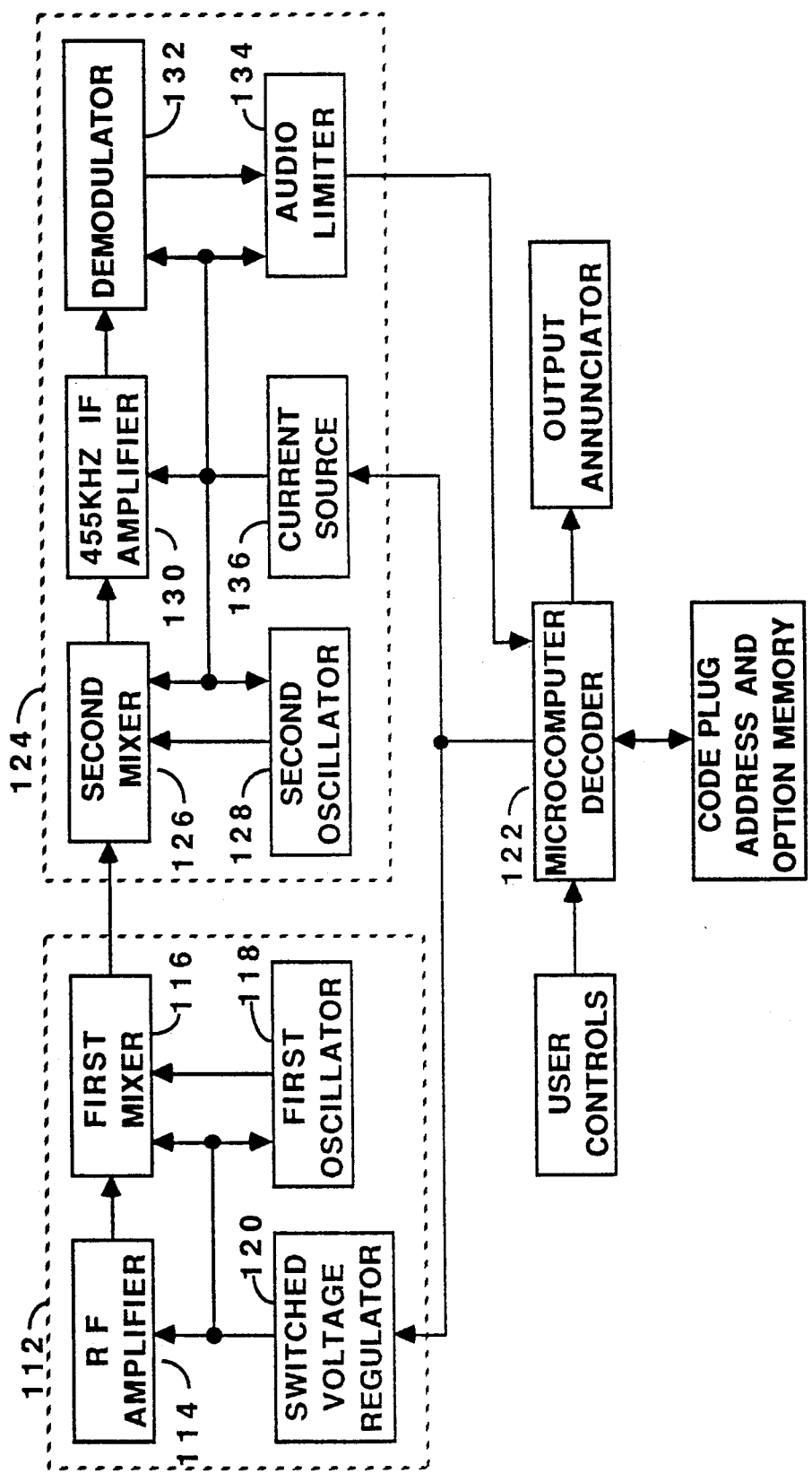
FIG. 1 is an electrical block diagram of a prior art paging receiver having a battery saver circuit for controlling the supply of power to the receiver portion.
Figure 2:
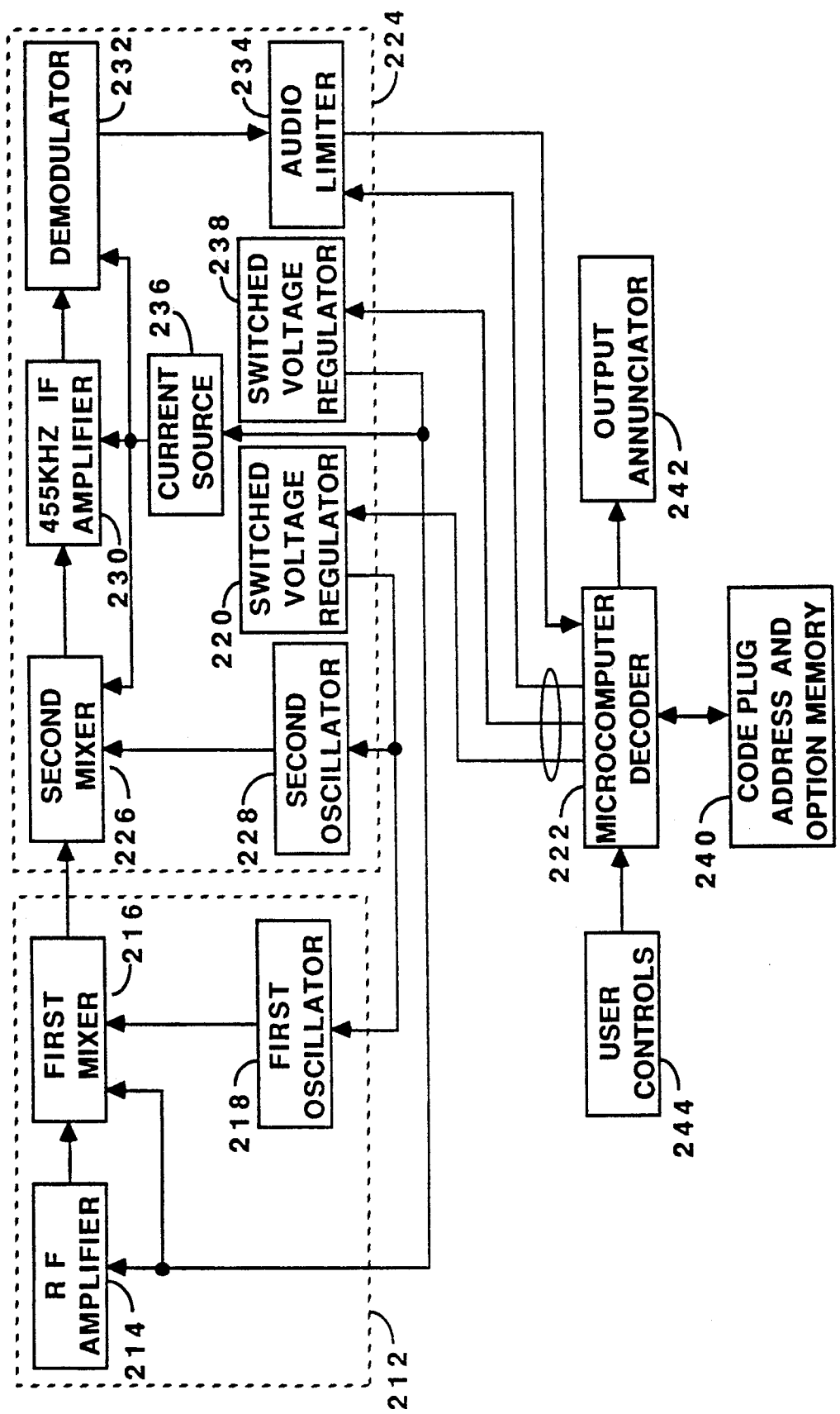
FIG. 2 is an electrical block diagram of the paging receiver of the present invention providing selective switching of the supply of power to the receiver portion.

Referring to the figures, FIGS. 2 through 5 show an apparatus and method for providing a selective supply of power to the receiver portion of a paging receiver as utilized in the present invention. FIG. 2 is an electrical block diagram showing a paging receiver having a receiver portion including a front end, or first conversion section, 212, and a back end, or second conversion section, 224. As shown from FIG. 2, the receiver portion of the paging receiver includes those circuit elements which function to receive an information signal delivered over an RF (radio frequency) carrier through those circuit elements which function to demodulate and shape the recovered signal.

Returning to FIG. 2, the information delivered over the RF carrier is intercepted by an antenna (not shown) and provided to the input of the high conversion section 212 of the paging receiver, specifically at the input of RF amplifier 214. The RF amplifier boosts the received information signal, which is then provided to the input of the first mixer 216. A second input to first mixer 216 is provided by the first oscillator 218. The first mixer 216 mixes the received information signal with the output of the first oscillator 218, to derive a first intermediate frequency signal output, at the output of the first mixer 216, in a manner well known in the art. Any of a number of well known first intermediate frequency output signals, such as at 10.7 MHz (megahertz), 17.9 MHz, 21.4 MHz and 45 MHz may be utilized in the preferred embodiment of the present invention, depending upon the frequency of the RF carrier signal.

The first intermediate frequency signal output is filtered and coupled to the backend section 224 of the paging receiver, specifically at the input of the second mixer 226. A second input to the second mixer 226 is provided by the second oscillator 228. The second mixer 226 mixes the first intermediate frequency signal with the output of the second oscillator 228, to derive a second intermediate frequency signal output, at the output of the second mixer 216, also in a manner well known in the art. The second intermediate frequency signal output from the second mixer 226 couples to the input of a second intermediate frequency (IF) amplifier, 230. While the second intermediate IF frequency is indicated in FIG. 2 as at 455 KHz (kilohertz), it will be appreciated other second intermediate frequencies may be utilized as well. The second intermediate frequency amplifier boosts the second intermediate frequency signal which is then coupled to the input of the demodulator 232. The demodulator 232 derives an information signal at the output which is representative of the signal encoded and modulated onto the carrier signal in a manner well known in the art. The information signal derived from the demodulator 232, which is the output of the receiver section, is coupled to the input of the audio, or data limiter 234, which provides waveshaping of the signal, to provide a a stream of digital information which is representative of the demodulated information signal. The stream of digital information is provided to a microcomputer decoder 222, which processes the signal, and which provides an alerting signal output which is coupled to the input of the output annunciator 242, when the received stream of digital information matches address information stored within a code memory means, such as the code plug address and option memory 240, in a manner well known in the art. Code plug 240 is a programmable read only memory, such as an EEPROM (electrically erasable programmable read only memory). The output annunciator 242 may provide any of a number of sensible alerting methods to alert the user of the paging receiver that information has been received. The sensible alerting methods include such methods as an audible alerting signal delivered by a speaker or audio transducer, a sensible alerting signal delivered by a vibrator, or a visual alerting signal delivered by a visual alerting annunciator, such as a lamp or LED. Control of the paging receiver is provided by the user controls 244 which couple into the microcomputer decoder 222, providing such user controls as turning on and off the paging receiver, resetting of the sensible alert, and recalling of received information when such information is stored within the paging receiver for subsequent presentation to the user, such as with an LCD display (not shown).

As shown in FIG. 2, the paging receiver of the present invention includes selectable control of the supply of power to the different receiver functions of the receiver portion. The receiver functions include, but are not limited to such functions as the RF amplifier, first and second mixers, first and second oscillators, first and second IF amplifiers and demodulator. The audio limiter provides waveshaping of the detected signal prior to being coupled into the decoder 222. As will be appreciated from the description to follow, each of the receiver functions of the receiver portion of the paging receiver has a characteristic turn-on time, that is the time required for the receiver function to stabilize when power is supplied to the receiver function. The supply of power to each of the receiver functions is selectively controlled in the preferred embodiment of the present invention by the microcomputer decoder 222, although it will be appreciated dedicated hardware decoder/controllers can be design to perform the same functions. Specifically microcomputer decoder 222 couples to a switched voltage regulator 220 which provides a first means to selectively supply power to the first oscillator 218 and the second oscillator 228. Microcomputer 222 also couples to a switched voltage regulator 238 which provides a second means to selectively supply power to the RF amplifier 214, first mixer 216 and the current source 236 which provides power to the second mixer 226, second intermediate frequency amplifier 230 and demodulator 232. Microcomputer 222 also couples to the audio limiter 234 to control the supply of power to the audio limiter 234. The selective control of the supply of power to the different receiver functions is shown in detail in FIG. 3.

In order to appreciate the advantages derived by selectively supplying power to the various receiver functions of the receiver portion of the paging receiver of the present invention, Table I below identifies typical current drains and turn-on, or stabilization times, for each of the receiver functions for a typical dual conversion, FM (frequency modulation) receiver, such as utilized in the preferred embodiment of the present invention. The relative improvements gained by utilizing the selective battery saving method for the receiver portion of a paging receiver will be described in detail below.

TABLE I

| Slow Start-up - 10 mSec | | Fast Start-up - 1 mSec | |
|---|---|---|---|
| First local oscillator | 400 µA | RF amplifier | 500 |
| Second local oscillator | 200 µA | First mixer | 300 |
| Data limiter | 50 µA | Second mixer | 200 |
| µA | | Balance of backend | 450 |
| µA | | | |
| Total | 650 µA | Total | 1450 |
| µA | | | |

As shown in Table I above, each of the different receiver functions of the receiver portion of the paging receiver have different current drains and turn-on times once power is supplied to each of the receiver functions. Receiver functions, such as the first and second oscillators, require substantially longer turn-on times to stabilize after power is supplied, and before reliable data processing is achieved, as compared to other receiver functions. The receiver functions which require long turn-on, or stabilization times are generally high-Q, such as the first and second oscillator functions. Circuits utilizing long time constants, such as the data limiter, also require long turn-on, or stabilization times. Most other receiver functions, such as the RF amplifier, first and second mixers, IF amplifiers and the demodulator, require only a relatively short time interval during which the receiver function will stabilize after power is supplied. The time intervals for receiver function stabilization, that is, 10 mSec (milliseconds) for slow start-up receiver functions, and 1 mSec for fast start-up receiver functions, are provided for example only. It will also be appreciated, the actual start-up times are a function of the particular design of each receiver function, and can vary with such circuit parameters as supply voltage, temperature and component variations utilized in the manufacture of each receiver function. The time interval required to provide reliable start-up of each receiver function is determined at the time of the design of each receiver function. The time intervals indicated in Table I define at least first and second predetermined time intervals for supplying power to each specified receiver function. For reliable operation, the turn-on times specified are at least twice the measured values to account for variations in supply voltage, temperature and components to insure long term operation of each receiver functions. It will be appreciated the specific current drain requirements of each receiver function, the number of receiver functions utilized in the receiver portion of the paging receiver, and the time required to stabilize each receiver function is a function of the design of the receiver portion of the paging receiver and the signaling protocol in which the paging receiver is being operated.

Figure 3A:
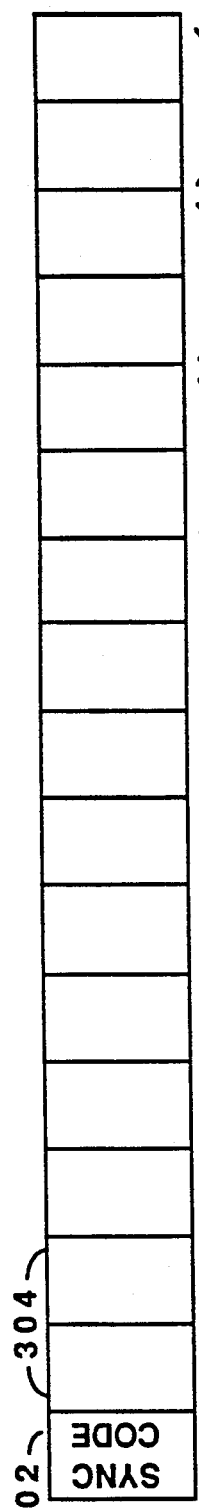
FIGS. 3A-3D are timing diagrams showing the selective switching of power to the receiver portion of the present invention.

Referring to FIG. 3A is shown a code signal 300 which is transmitted in one of the commonly used signaling formats for the transmission of information. Code signal 300 shown is specifically that of the code signal transmitted in the well known POCSAG signaling format which is shown for example only. It will be appreciated the selective control of the supply of power to the different receiver functions may also be utilized with other signaling formats. The signal code 300, which in the POCSAG signaling format is termed a batch, comprises a thirty-two bit synchronization codeword, or sync code, 302 which provides frame synchronization of the data following in a manner well known in the art. Eight information, or message groups, Group 1-Group 8, are provided for the transmission of address and message information to the paging receivers operating in each system. Each group in the POCSAG signaling format comprises frames 304 comprising thirty-two bit BCH address codewords, or thirty-two bit BCH data codewords. In operation, each paging receiver operating within the system is assigned to one of the eight groups, Group 1-Group 8, thereby providing the basic battery saving function well known for the POCSAG signaling format.

Figure 3B:
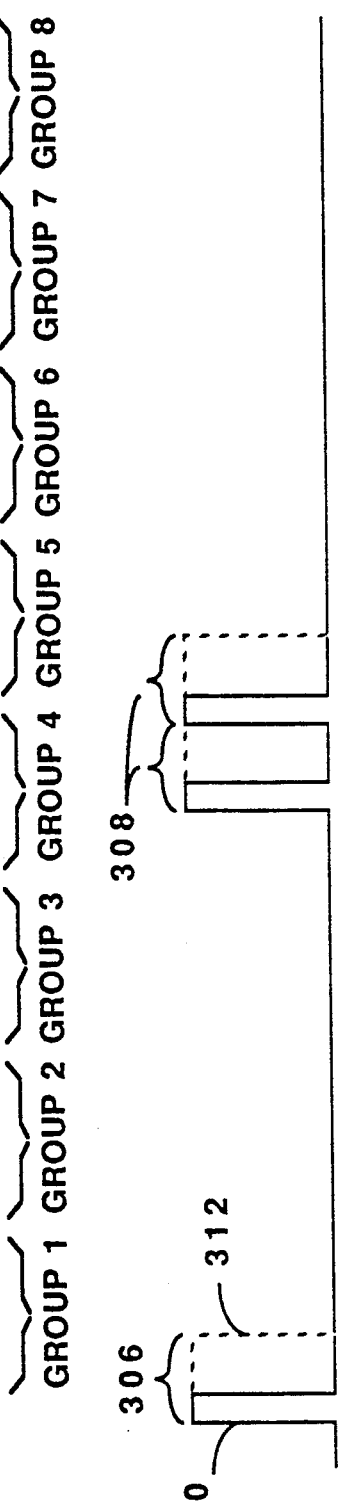

Referring to FIG. 3B, each receiver operating within the system is enabled, that is, power is supplied to the receiver portion of the paging receiver, during a decoding window 306 for the synchronization codeword 302, and during decoding windows 308 for the address and message codewords. As shown in FIG. 3B, the paging receiver is assigned to battery saving Group 4. As shown in FIG. 3B, the decoding window for the synchronization codeword comprises two decoding window portions, a first predetermined eight bit window portion 310, and a second predetermined twenty-four bit window portion 312. The multiple decoding window for the synchronization codeword is described in U.S. Pat. No. 4,995,099 issued Feb. 19, 1991 to Davis, entitled "Power Conservation Method And Apparatus for a Portion of a Predetermined Signal" which is assigned to the Assignee of the present invention and which is incorporated by reference herein. Unlike the prior art sync maintenance methods, sync maintenance is provided by first correlating the first eight bit portion of the synchronization codeword 310, and when the first portion of the synchronization codeword is not detected, by further correlating the second twenty-four bit portion of the synchronization codeword. However, when the synchronization codeword is correlated during the first portion, power to the receiver is suspended, to provide improved battery life. In a 1200 baud POCSAG system, each data bit is 0.83 mSec in duration, consequently sync maintenance as described above requires on the average 6.67 mSec per POCSAG batch, as compared to 26.67 mSec with prior art methods.

As further described in U.S. Pat. No. 4,996,526 issued Feb. 26, 1991 to DeLuca, entitled Power Conservation Method and Apparatus for a Portion of a Synchronous Information Signal" which is assigned to the Assignee of the present invention and which is incorporated by reference herein, address decoding is provided by first correlating a first eight bit portion of the address codeword 314, and thereafter when the first portion of the address codeword is detected, by further correlating a second portion of the address codeword. When the address codeword is not correlated during the first portion, power to the receiver is suspended, also providing improved battery life. Again, in a 1200 baud POCSAG system, with each data bit being 0.83 mSec in duration, the detection of an address codeword not designating the paging receiver requires on the average 6.67 mSec per assigned POCSAG frame per batch as compared to 26.67 mSec for prior art methods.

Table II below compares the time savings provided in the preferred embodiment of the present invention to that of the prior art battery saving methods using a 1200 baud POCSAG signaling format as an example.

TABLE II

| Time Interval | Prior art | Present Invention |
|---|---|---|
| low speed | 10.00 mSec | 10.00 mSec |
| high speed | 10.00 mSec | 1.00 mSec |
| Sync Maintenance | 26.67 mSec | 6.67 mSec |
| Address Detection | | |
| Incorrect | 26.67 mSec | 6.67 mSec |
| Correct | 26.67 mSec | 26.67 mSec |

Figure 3C:
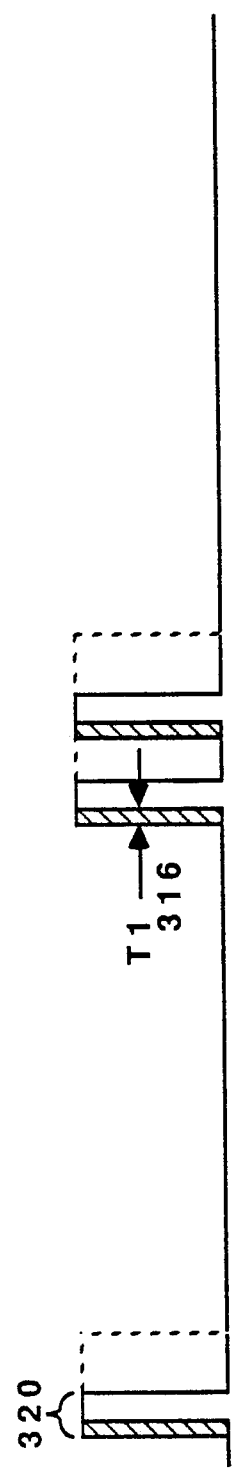

The time provided for turn-on of the high speed receiver functions is shown in FIG. 3C as time interval T1 (316), which in the preferred embodiment of the present invention is a predetermined time interval, such as 1 mSec, providing a total synchronization maintenance time of 7.67 mSec (320), as compared to 36.67 mSec in the prior art.

Figure 3D:
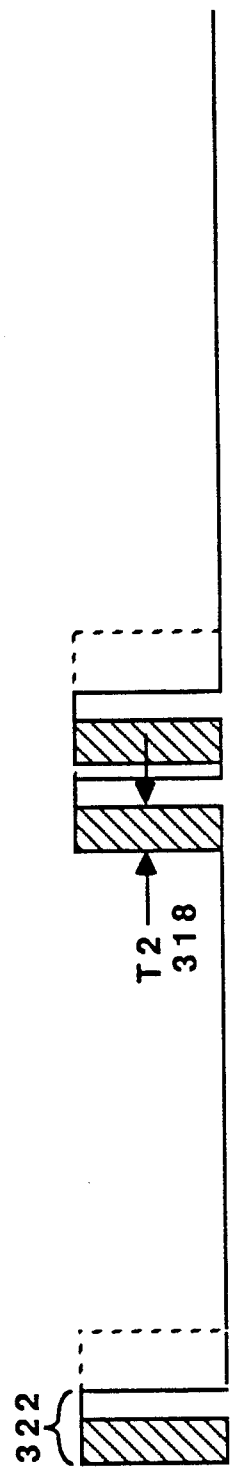

The time provided for turn-on of the low speed receiver functions is shown in FIG. 3D as time interval T2 (318) which in the preferred embodiment of the present invention is also a predetermined time interval, such as 10 mSec, providing a total sync maintenance time of 16.67 mSec (322), as compared to 36.67 mSec in the prior art.

Figure 3E:
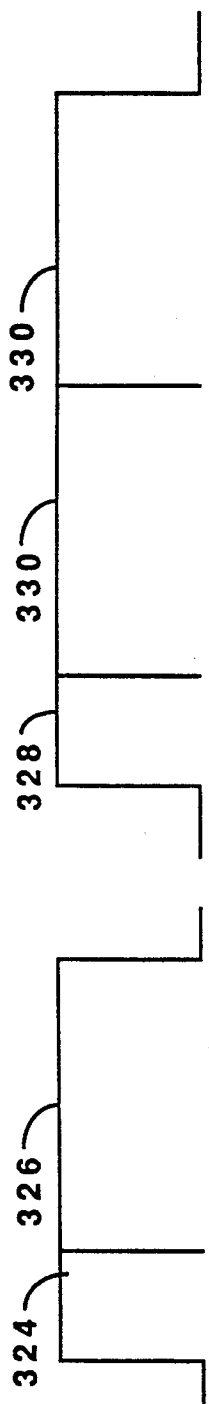
FIGS. 3E-3G are timing diagrams used to compare the average current drain requirements of the present invention to the prior art.
Figure 3F:
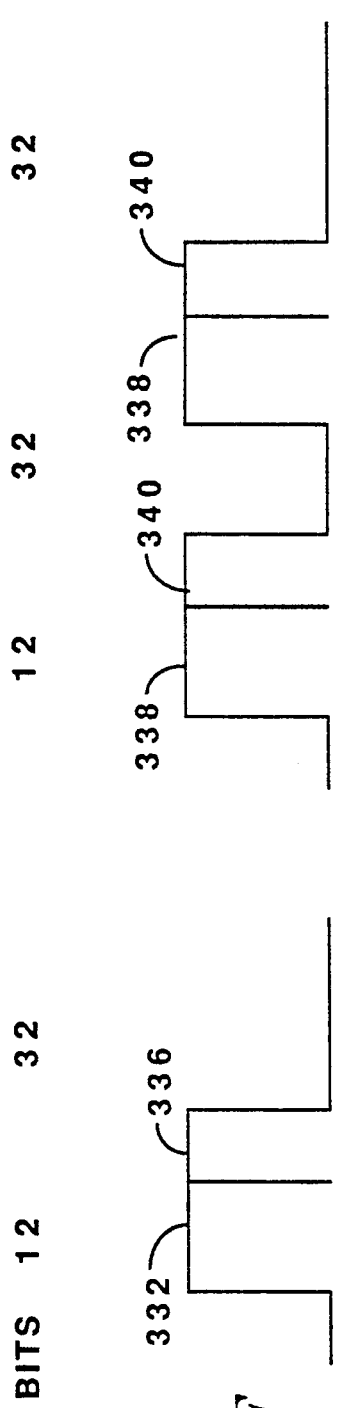
Figure 3G:
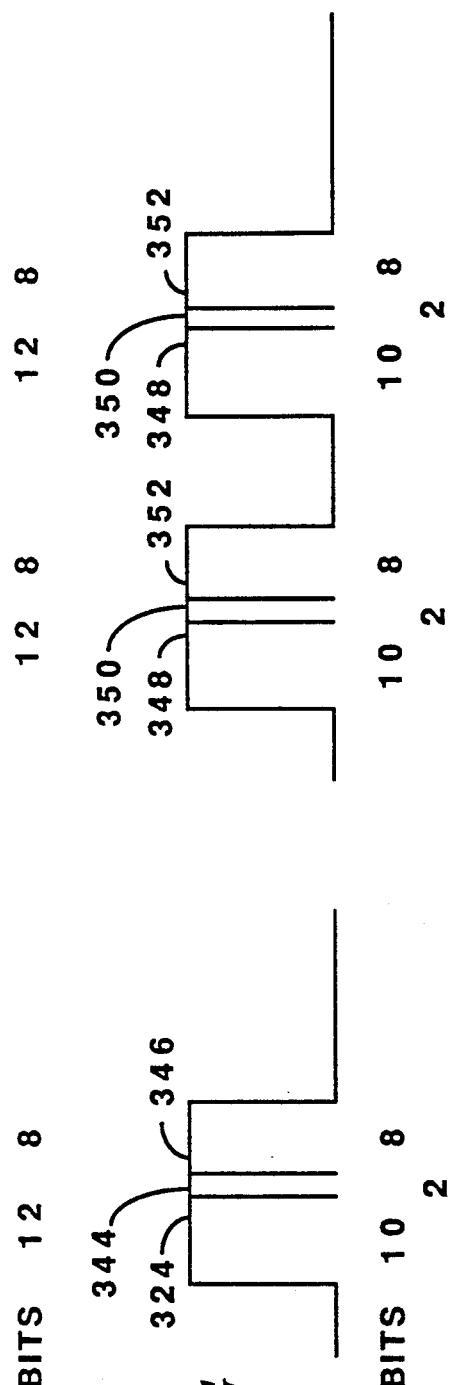

In order to appreciate the improvement in battery life which can be obtained by utilizing the selective supplying of power to each of the receiver functions, a comparison of the energy consumed for the prior art method is shown in FIG. 3E, for the methods utilizing the sync maintenance method of Davis, and the address decoding method of DeLuca is shown in FIG. 3F, and of the method of the present invention is shown in FIG. 3G.

As shown in FIG. 3E, the receiver portion is powered for twelve bit times 324 (10 mSec@1200 baud) prior to receiving the thirty-two bit synchronization codeword 326. The receiver portion is powered a second time for twelve bit times 328 prior to receiving two thirty-two bit address or message codewords 330. Assuming a total receiver portion current drain of 2100 μA (micro-amperes) including the data limiter, which is not a receiver function, as shown in Table I, the average current drain consumed over a POCSAG batch by a receiver utilizing the prior art battery saving methods would be:

$$\text{Average Current Drain } \mu A = \frac{[2 \times (12 \text{ bits}) + 3 \times (32 \text{ bits})] \times 2100}{(17 \text{ frames}) \times (32 \text{ bits})}$$

$$= 22\% \times 2100 \, \mu A$$

$$= 462 \, \mu A$$

where the POCSAG signaling format provides one thirty-two bit frame for the synchronization codeword and sixteen thirty-two bit frames for address and message codewords, for a total of seventeen thirty-two bit frames (17 frames × 32 bits), the receiver comes up early at least twice for twelve bits prior to the synchronization codeword and assigned group detection (2×12 bits), and the receiver remains on for three full frames for synchronization codeword and address detection (3×32 bits). A receiver utilizing the prior art battery saving method would spend on the average twenty-two per cent of the time turned on consuming power for an average receiver portion current drain of 462 μAmps.

In comparison, the battery saving method shown in FIG. 3F would utilize $$\text{Average Current Drain } \mu A = \frac{[3 \times (12 \text{ bits}) + 3 \times (8 \text{ bits})] \times 2100}{544 \text{ bits}}$$

$$= 11\% \times 2100 \, \mu A$$

$$= 231 \, \mu A$$

where the receiver comes up early for three twelve bit time intervals, and remains on for only eight bit times (sync maintenance and non-detection of address). Address detection would increase the average current drain figure.

A two to one improvement in the average current drain is achieved utilizing the battery saving methods of Davis and DeLuca. In further comparison, the battery saving method of the present invention shown in FIG. 3G would utilize $$\text{Average Current Drain} = [3 \times (10 \text{ bits}) \times (650 \, \mu A) +$$
$$3 \times (2 \text{ bits}) \times (2100 \, \mu A) +$$
$$3 \times (8 \text{ bits}) \times (2100 \, \mu A)] /$$
$$(544 \text{ bits})$$
$$= 152 \, \mu A$$

where thirty bit times are spent with the slow turn-on receiver functions active (3×10 bits), six bit times are spent with the low and high turn-on receiver functions active (3×2 bits), and 24 bit times are spent for sync maintenance and address detection (3×8 bits). As shown, the battery saving method of the present invention would utilize on the average only thirty-three per cent of the current drain as compared to the prior art battery saving methods, a three-to-one improvement.

It will be appreciated, the example provided for the average current drain savings are computed for ten millisecond low speed function turn on times and approximately one millisecond high speed function turn on times. The actual savings accrued will be determined by the actual turn on times encountered in any particular receiver design approach.

Figure 4:
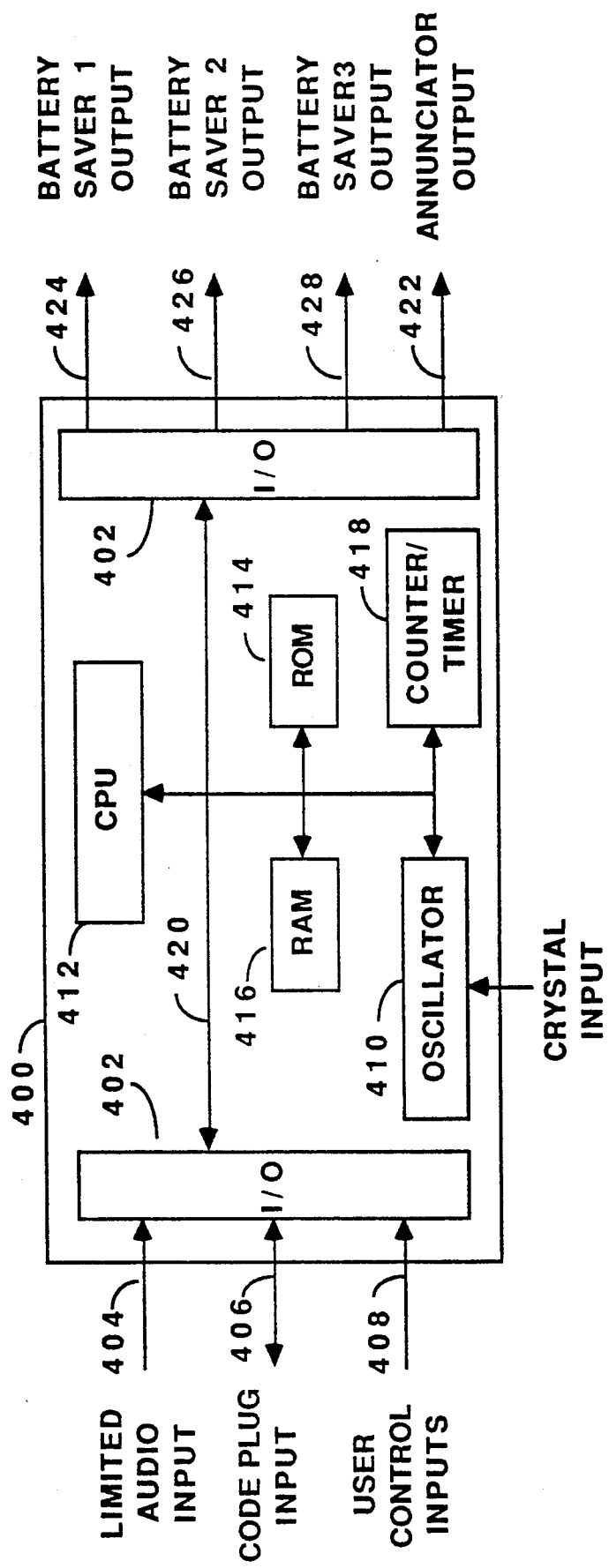
FIG. 4 is an electrical block diagram of the microcomputer decoder of the present invention.

FIG. 4 is an electrical block diagram of the microcomputer decoder of the preferred embodiment of the present invention which provides the selective supplying of power to each of the receiver functions of the receiver portion of the paging receiver. The microcomputer 400 of the present invention is preferably implemented using an MC68HC05 microcomputer such as manufactured by Motorola Inc. It will be appreciated from the description to follow, other microcomputers may also be utilized to provide the same function. As previously stated, microcomputer 400 functions as a decoder for decoding the coded message signals including periodically transmitted synchronization codewords, or signals, and address and message codewords, or signals, which are received by the receiver portion of the paging receiver and which are coupled to the limited audio input 404 of the microcomputer through the input/output (I/O) port 402. The microcomputer 400 also functions as a synchronization means for synchronizing the timing of the decoder for decoding the address and message information. The operation of a microcomputer for decoding and general battery saving is described in U.S. Pat. No. 4,518,961 issued May 21, 1985 to Davis et al, entitled "Universal Paging Device with Power conservation" which is assigned to the Assignee of the present invention, and which is incorporated by reference herein. The microcomputer couples to the code plug through I/O port 402 via the code plug input 406. The code plug stores address information designating each receiver, information defining the operating features of the paging receiver, and in the preferred embodiment of the present invention, predetermined timing information defining the low speed and high speed receiver circuit turn on times. The low speed and high speed receiver circuit turn on times are determined during the design and manufacture the the paging receiver, and since they are programmed into the code plug, may be altered at a later time should the need arise to compensate for variations in the turn on of individual receiver functions which may occur after the times were initially defined. User controls couple to the microcomputer through I/O 402 via the user control input 408. The user controls provide such user control functions as resetting the alert, recalling and reading stored messages and other well known control features. Oscillator 410 provides the timing reference for the operation of the central processing unit (CPU) 412 which executes the routines which control the operation of the paging receiver, and which are stored in read-only memory (ROM) 414. ROM 414, as described stores the routines controlling such paging receiver functions as address decoding, message storage and recall, and the battery saving routines of the battery saving apparatus of the present invention. Random access memory (RAM) 416 stores the variables utilized in the execution of the various paging receiver control subroutines. RAM 416 is also utilized to store messages which are received, and in those instances where very large messages are received, additional external RAM (not shown) may be provided. A counter/timer 418 which couples to the oscillator 410 generates the timing signals utilized to control the paging receiver functions. Timing signals are synchronized with the received message signals for controlling decoding and battery saver operation and are generated by counter/timer 418. Each of the elements of the microcomputer are coupled through an address, data and control bus 420 which allows communication between each of the elements and also communication to the outside of the microcomputer through the I/O port 402. After an address has been received which designates the particular paging receiver, microcomputer 400 generates annunciator control and annunciator output signals at the annunciator output 422. The microcomputer 400 also functions as the battery saving means for controlling the battery saver operation through I/O ports 424, 426 and 428. In the preferred embodiment of the present invention battery saver 1 output 424 is utilized to selectively control the supply of power to the low speed receiver functions, battery saver 2 output 426 is utilized to selectively control the supply of power to the high speed receiver functions, and battery saver 3 output 428 is utilized to selectively control the supply of power to the data limiter receiver function. While three battery saver control outputs have been shown and described, it will be appreciated that any number of battery saver control outputs may be provided to selectively control the supply of power to any number of selected receiver functions.

Figure 5A:
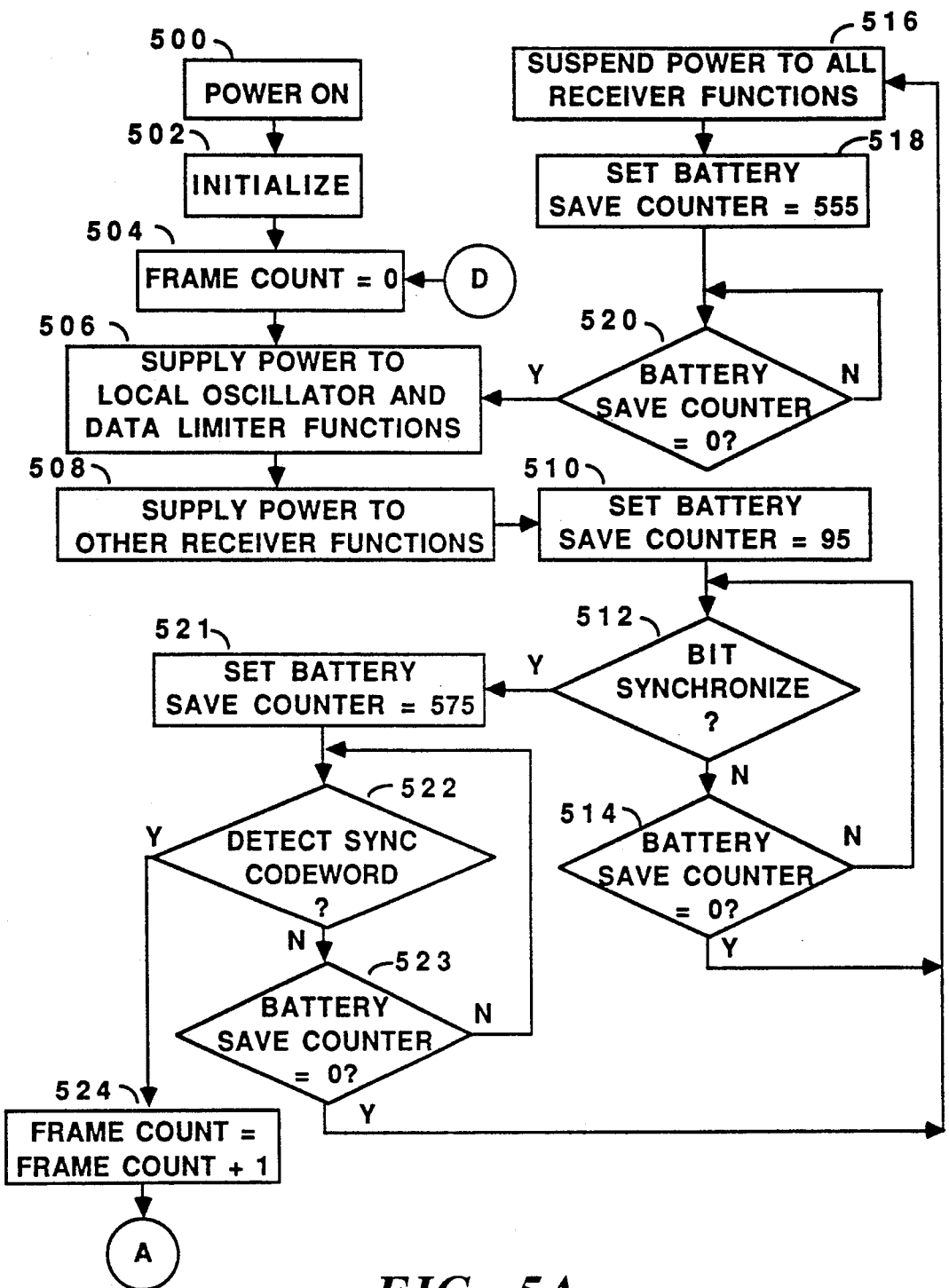
FIGS. 5A-5E are flow diagrams of the microcomputer decoder utilized for selective switching of the supply of power to the receiver portion of the present invention.

Specific details of the battery saving apparatus of the present invention is provided in FIGS. 5A-5E which provide flow charts of the selective power control battery saving method of the present invention. It should be noted, the description provided by FIGS. 5A-5E are provided in the context of the POCSAG signaling format which is provided for example only, and that other signaling formats may incorporate the battery saver method of the present invention, as is more specifically described in FIG. 5C. As shown in FIG. 5A, after power to the paging receiver is turned on, at step 500, the microcomputer is initialized, at step 502. Included in the initialization process is the recalling from the code plug memory of the turn on information for each receiver function, or group of receiver functions. The frame count is also initialized to zero, indicating the synchronization codeword frame, at step 504. Power is initially supplied to the local oscillators and the data limiter functions, at step 506, and shortly thereafter power is supplied to the other receiver functions as previously described, at step 508. A battery saver counter is set to 95, to provide a sufficient time interval to detect when a POCSAG signal is present on the channel. When a POCSAG signal is detected on the channel, the microcomputer decoder first attempts to obtain bit synchronization, at step 512. When bit synchronization is not obtained at step 512, the microcomputer decoder checks to see if the battery saver count has counted down to zero, at step 514. When the battery saver counter has counted down to zero, at step 514, indicating bit synchronization was not obtained, the microcomputer decoder suspends the supply of power to all receiver functions, at step 516. The battery saver count is reset to 555, at step 518, and after the count has again counted down to zero, at step 520, the microcomputer again enables the supply of power to the local oscillators and data limiter functions, at step 506. Shortly thereafter power is again supplied to the other receiver functions, at step 508. The battery saver counter is again reset to 95, at step 510, and the microcomputer decoder attempts to bit synchronize, at step 512. When bit synchronization is obtained, at step 512, the microcomputer decoder sets the battery saver counter to 575, at step 621, and begins looking for detection of the synchronization codeword, at step 522. When the synchronization codeword is not detected, at step 522, the microcomputer decoder checks to see if the battery saver counter is zero, at step 523. When the battery saver counter is zero, at step 523, the microcomputer decoder again suspends the supply of power to the receiver, at step 516. Steps 518 through 522 are then repeated, as described above. In the synchronization codeword acquisition mode, the complete codeword must be detected. When the complete synchronization codeword is detected, at step 522, the microcomputer increments the frame counter, at step 524, to indicate the next decoding interval.

Figure 5B:
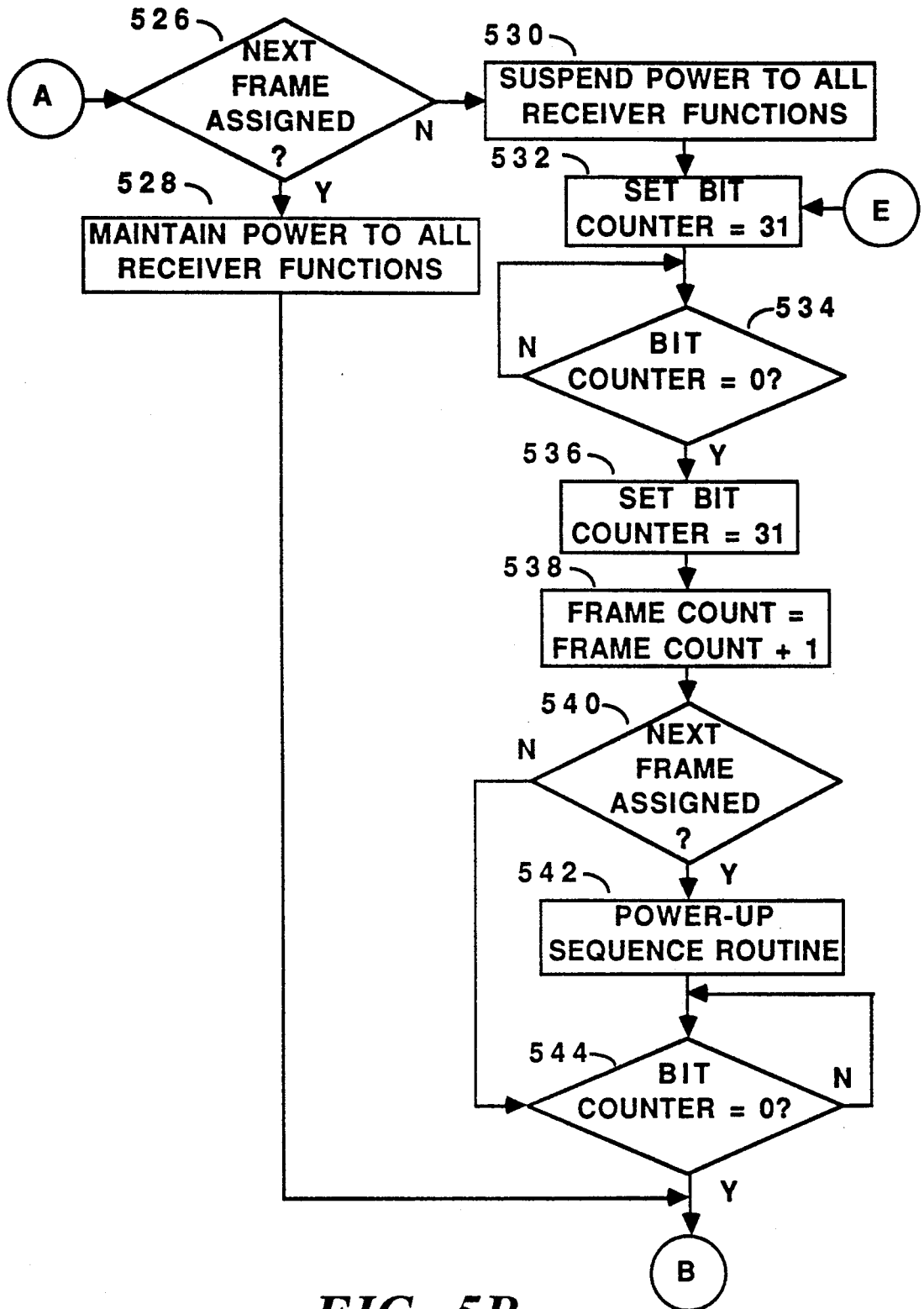

Moving to FIG. 5B, the microcomputer checks to see if the next frame is assigned to the paging receiver, at step 526. When the paging receiver is assigned to the next frame, the microcomputer maintains the supply of power to all receiver functions, at step 528. When the next frame is not assigned to the paging receiver, at step 526, the microcomputer suspends the supply of power to all receiver functions, at step 530. The bit counter is set to thirty-one, at step 532, and is decremented to a count of zero, at step 534, which corresponds to the length of one POCSAG address or data word. The bit counter is again set to thirty-one, at step 536. The frame counter is increment by one to indicate the next frame, at step 538. If the next frame is assigned to the paging receiver, in this instance frame 2, the microcomputer enters the power-up subroutine, at step 542, When the paging receiver is not assigned to the next frame, at step 540, or the power up subroutine is concluded, at step 542, the microcomputer checks to see if the bit counter has decremented to zero, at step 544, indicating the conclusion of the current frame. It will be appreciated that the flow described by FIG. 5B will be repeated for each frame not specifically assigned to the paging receiver.

Figure 5C:
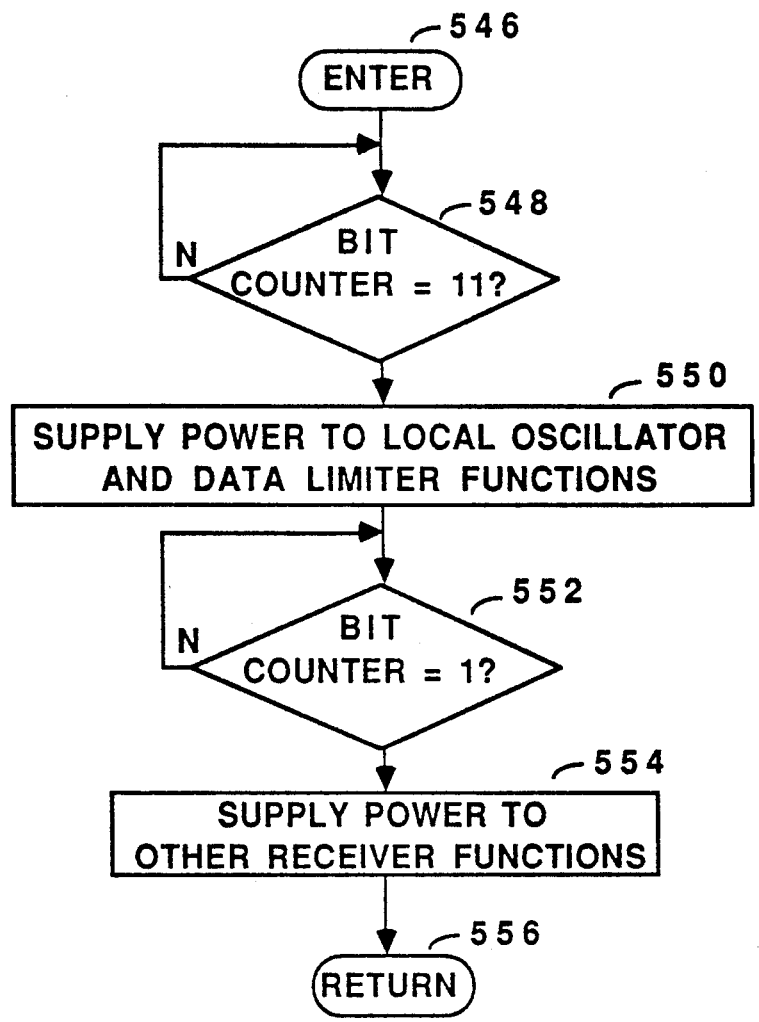

Moving to FIG. 5C, when the power up subroutine was called at step 542 of FIG. 5B, the microcomputer enters the subroutine, at step 546. In the example shown in FIG. 5C, when the bit counter has decremented to a count of eleven, at step 548, power is supplied to the local oscillators and the data limiter, at step 550. When the bit counter has next decremented to a count of one, at step 552, power is supplied to the other receiver functions, as previously described, at step 554, after which the microcomputer returns, at step 556 to step 542, of FIG. 5B. The bit count indicated in step 548 is by way of example twelve bit times before the start of the next frame, which for the 1200 baud POCSAG signaling format, corresponds to a period of ten milliseconds. In order to turn the low speed receiver circuits on ten milliseconds before the start of the next frame, power to the slow speed receiver circuits must be turned on at zero plus twelve bit times, or at a bit count of eleven. Likewise, to turn the high speed receiver functions on, at or close to one millisecond, the bit count is set to one, which corresponds to two bit counts prior to the start of the next frame, or a period of 1.67 mSec before the next frame. It will be appreciated finer resolution may be provided in the counter to provide fractional bit times, and that when so implemented bits times approaching one millisecond, or any other time interval may be established prior to the start of the next frame to turn on power to selected receiver functions. It will also be appreciated that the turn on times may be readily varied to provide any required receiver function turn on times by reprogramming the code plug. It will also be appreciated, that while the power-up sequence routine, only described turning on two groups of receiver functions at two predetermined time intervals prior to the start of the next frame, any number of start-up times may in actuality be programmed to control any number of individual, or grouped receiver functions, thereby conserving power by not turning on any receiver function until that function must be turned on to guarantee the reception of a desired signal.

Figure 5D:
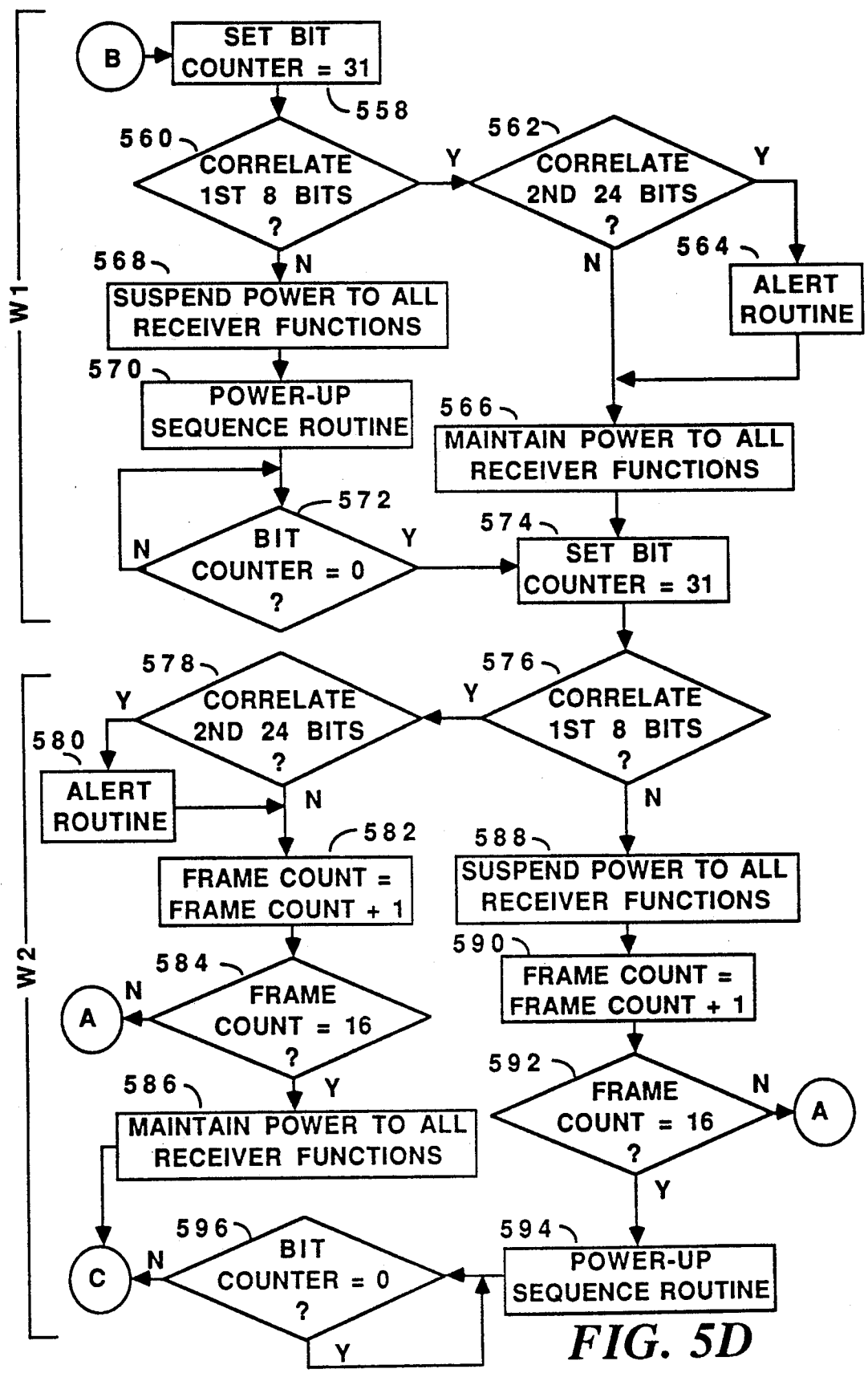

Moving to FIG. 5D, the bit counter is again set to thirty-one, at step 558. The microcomputer decoder accepts eight bits, at step 560, and correlates these bits to determine if the address being received could be an address designated for the paging receiver. When the first eight bits match those of a designated address stored in the code plug, or are less than a predetermined number of errors in matching the designated address stored in the code plug, the microcomputer decoder begins correlating the balance of the twenty four bits, at step 562. When during the correlation of the second portion of the address, it is determined the received address matches an address designated for the paging receiver, at step 562, the decoder enters an alerting routine, at step 564, and continues to maintain power to all receiver functions, at step 566, in anticipation of receiving the second address or message codeword in the next frame. Routines required to provide the alerting functions are well known in the art, and will not be described further herein.

When the first eight bits of the received address did not correlate with a designated address for the paging receiver, at step 560, of FIG. 5D, power is suspended to all receiver functions, at step 568. The power up sequence subroutine is then entered, at step 570, in anticipation of receiving the second address or message codeword in the next frame. After the bit counter has decremented to zero, at step 572, the bit counter is again set to thirty-one, at step 574.

The microcomputer decoder next accepts eight bits, at step 576, and correlates these bits to determine if the address being received could be an address designated for the paging receiver. When the first eight bits match those of a designated address stored in the code plug, or are less than a predetermined number of errors in matching the designated address stored in the code plug, the microcomputer decoder begins correlating the balance of the twenty four bits, at step 578. When during the correlation of the second portion of the address, it is determined the received address matches an address designated for the paging receiver, at step 578, the decoder enters the alerting routine, at step 580. The frame counter is next advanced by one, at step 582, and checked to determined when the frame count is sixteen, at step 584. When the frame count is not sixteen, at step 584, the next frame is not an assigned frame, and the microcomputer returns to the null frame routine beginning at step 526 through 544. When the frame count is sixteen, at step 584, indicating the next received information will be the synchronization codeword, power is maintained to all receiver functions, at step 586.

When the first eight bits of the information received did not correlate to a designated address for the paging receiver, at step 576 of FIG. 5D, power to all receiver functions is suspended, at step 588. The frame counter is incremented by one, at step 590, and again the frame count is checked to determined when the frame count is sixteen, at step 592. When the frame count is not sixteen, at step 592, the next frame is not an assigned frame, and the microcomputer returns to the null frame routine beginning at step 526 through 544. When the frame count is sixteen, at step 592, indicating the next received information will be the synchronization codeword, the power up subroutine is entered, at step 594, preparing the receiver functions for the reception of the synchronization codeword. When the bit counter count has decremented to zero, at step 596, the microcomputer enters the sync maintenance routine, at step 598, of FIG. 5E.

While flow chart 5D describes the specific operation of the battery saving and decoding functions in view of detecting a received address, it will be appreciated, that the battery saver operation described herein also applies to the reception of message codewords, as in a typical POCSAG signaling format. In the case where the message being received is longer than a single frame, power is maintained to the receiver until the complete message is received, as in conventional POCSAG transmissions.

Figure 5E:
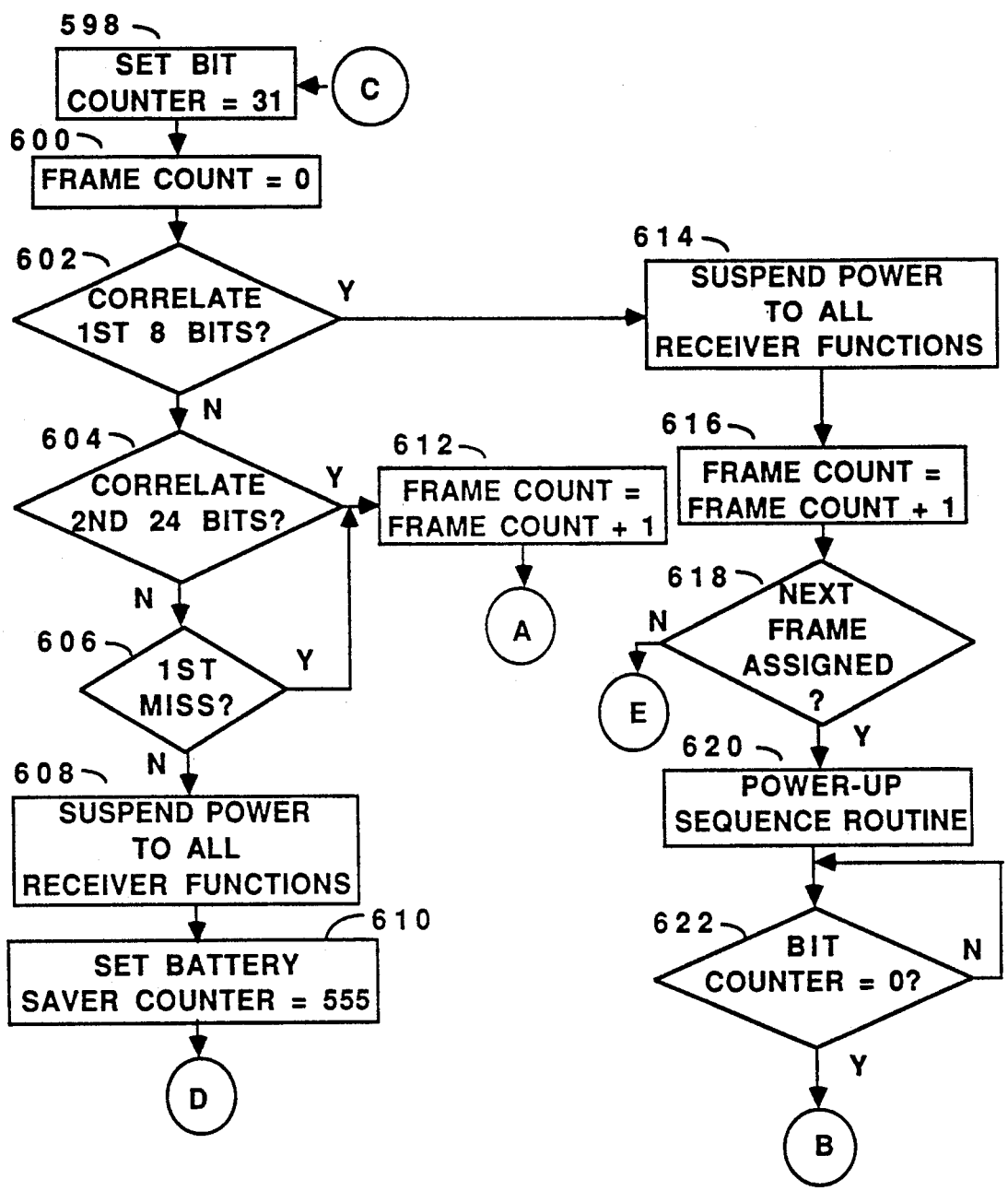

Moving to FIG. 5E, the bit counter is set to thirty-one, at step 598. The frame counter is reset to zero, at step 600, after which the first eight bits of the received synchronization codeword are correlated, at step 602. When the first eight bits of the synchronization codeword do not match the pattern of the actual synchronization codeword, or include more than a predetermined number of errors for the actual synchronization codeword, the decoder continues to correlate the balance of the twenty-four bits of the received synchronization codeword, at step 604. When the synchronization codeword is not detected, at step 604, the microcomputer checks to see if this is the first miss, at step 606. When this is not the first sequentially received synchronization codeword which has been missed, this indicates the paging receiver may be out of range of the transmitter, or that data in a different signaling format is being transmitted on the channel. Power is suspended to all receiver functions, at step 608, and remains suspended for a count of 555 bit times, at step 610, after which the sync acquisition routine is entered at step 504 of FIG. 5A.

Returning to FIG. 5E, when the synchronization codeword was missed only the first time, at step 606, or the synchronization codeword has been detected after correlating the full thirty-two bits, at step 604, the frame count is incremented by one, at step 612. The microcomputer then proceeds to step 526 of FIG. 5B.

When correlation is achieved during the first eight bits of the synchronization codeword, at step 602 of FIG. 5E, power is suspended to all receiver functions, at step 614. The frame count is incremented by one, at step 616, after which the microcomputer checks if the next frame is assigned, at step 618. When the next frame is assigned, at step 618, the microcomputer enters the power-up sequence subroutine, at step 620. After the bit counter decrements to zero, at step 622, the microcomputer jumps to step 558 of FIG. 5D to begin processing the received data for address and message information. Returning to FIG. 5E, when the next frame is not assigned, at step 618, the microcomputer jumps to step 532 of FIG. 5B.

In summary, a method and apparatus for selectively supplying power to each receiver function has been described which can be utilized with the POCSAG signaling format to provide improved battery saver performance. While the operation of the preferred embodiment of the present invention was described in the context of utilizing the POCSAG signaling format, it will be appreciated by one skilled in the art, that selective power-up of receiver functions, as described in the instant specification above, can be used with any signaling format to provide improved battery saver performance.

While specific embodiments of this invention have been shown and described, further modifications and improvements will occur to those skilled in the art. All modifications which retain the basic underlying principles disclosed and claimed herein are with the scope and spirit of the present invention.

We claim:

1. A battery powered communication receiver for receiving coded message signals, comprising:
    a receiver portion for receiving and demodulating the coded message signals, said receiver portion including
        a first receiver function requiring power to be supplied thereto for at least a first predetermined time interval prior to and continuing therefrom the reception of the coded message signals, and
        at least a second receiver function requiring power to be supplied thereto for at least a second predetermined time interval prior to and continuing therefrom the reception of the coded message signals; and
    battery saving means, coupled to said receiver portion, and responsive to the coded message signals, said battery saving means including
        first means for selectively supplying power to said first receiver function for the first predetermined time interval prior to and continuing therefrom the reception of the coded message signals, and
        at least a second means for selectively supplying power to at least said second receiver function for the second predetermined time interval prior to and continuing therefrom the reception of the coded message signals.

2. The battery powered communication receiver according to claim 1, wherein the second predetermined time interval is less than the first predetermined time interval.

3. A battery saver circuit for a battery powered communication receiver having a receiver portion including first and at least second receiver functions for receiving and demodulating coded message signals, said battery saving circuit comprising:
    a first means for selectively supplying power to at least the first receiver function, the first receiver function requiring power to be supplied for at least a first predetermined time interval prior to and continuing therefrom the reception of the coded message signals; and
    at least a second means for selectively supplying power to the second receiver function, the second receiver function requiring power to be supplied for at least a second predetermined time interval prior to and continuing therefrom the reception of the coded message signals.

4. The battery powered communication receiver according to claim 3, wherein the second predetermined time interval is less than the first predetermined time interval.

5. A battery saver method for enabling the reception of coded message signals by a battery powered communication receiver having a receiver portion for receiving and demodulating including first and at least second receiver functions, the first receiver function requiring power to be supplied thereto for at least a first predetermined time interval prior to and continuing therefrom the reception of the coded message signals, and the at least second receiver function requiring power to be supplied thereto for at least a second predetermined time interval prior to and continuing therefrom the reception of the coded message signals, said method comprising the steps of:

selectively supplying power to the first receiver function for the first predetermined time interval prior to and continuing therefrom the reception of the coded message signals; and selectively supplying power to the at least second receiver function for the second predetermined time interval prior to and continuing therefrom the reception of the coded message signals.

6. A battery saving apparatus for a battery powered communication receiver having a receiver portion including first and at least second receiver functions for receiving and demodulating coded message signals, comprising:

code memory means, for storing predetermined timing information;

timing means, responsive to the predetermined timing information, for periodically generating at least first and second battery saving timing control signals;

first means, responsive to the first battery saving timing control signal, for selectively supplying power to the first receiver function for a first predetermined time interval prior to and continuing therefrom the reception of the coded message signals; and at least second means, responsive to the second battery saving timing control signal, for selectively supplying power to the second receiver function for a second predetermined time interval prior to and continuing therefrom the reception of the coded message signals.

7. The battery saving apparatus of claim 6, wherein the second predetermined time interval is less than the first predetermined time interval.

8. The battery saving apparatus of claim 6, wherein the coded message signals include synchronization signals, and wherein said battery saving apparatus further comprises:

synchronization means, coupled to said timing means and responsive to the synchronization signals for synchronizing the generation of the battery saving timing signals for selectively supplying power to said first and at least second receiver functions at the first and second predetermined time intervals prior to and continuing therefrom the reception of the coded message signals.

9. The battery saving apparatus to claim 6, wherein said code memory means is a programmable read only memory.

10. The battery saving apparatus to claim 6 wherein said first and said at least second means for selectively supplying power comprises:

a controller, responsive to the timing information, for generating the battery saver control signals, and first and second switch voltage regulators, responsive to the battery saver control signals, for selectively supplying power to said first and second functions of the battery powered communication receiver.

11. The battery saving apparatus of claim 10, wherein said controller is a programmable microcomputer.

* * * * *